United States Patent [19]

Murray

[11] 4,404,462
[45] Sep. 13, 1983

[54] UNIVERSAL TEMPERATURE CONTROL CIRCUITS

[75] Inventor: Wayne A. Murray, Sanger, Calif.

[73] Assignee: Edsyn, Inc., Van Nuys, Calif.

[21] Appl. No.: 248,187

[22] Filed: Mar. 30, 1981

[51] Int. Cl.³ .............................................. H05B 1/02
[52] U.S. Cl. ................................... 219/497; 219/501;
219/506; 219/502; 330/259; 330/291
[58] Field of Search ............... 219/494, 497, 501, 506,
219/502; 330/259, 260, 291, 282

[56] References Cited

U.S. PATENT DOCUMENTS

| | | |
|---|---|---|
| 3,883,753 | 5/1975 | Harrison, Jr. et al. ............. 219/497 |
| 3,946,198 | 3/1976 | Foote ................................... 219/497 |
| 3,946,200 | 3/1976 | Juodikis ............................... 219/501 |
| 3,968,467 | 7/1976 | Lampen et al. ...................... 219/501 |
| 4,167,663 | 9/1979 | Granzow, Jr. et al. ............. 219/497 |
| 4,236,064 | 11/1980 | Aiba .................................... 219/497 |

FOREIGN PATENT DOCUMENTS 2816420 10/1979 Fed. Rep. of Germany ...... 219/497

Primary Examiner—M. H. Paschall
Attorney, Agent, or Firm—Daniel T. Anderson

[57] ABSTRACT

Various electronic circuits are disclosed for controlling the temperature of an object by means of a resistive heating element. Some of the circuits include a digital display for displaying the actual temperature A plurality of different temperature sensors may be used, such, for example, as a resistive sensor, a thermocouple or a thermistor. The sensor may either have a positive or a negative temperature coefficient. Since most of the sensors are not strictly linear, different means are disclosed for compensating for their nonlinearity. Some of the control circuits feature a proportional control to which may be added an anticipatory control. Less sophisticated and more inexpensive circuits simply provide an on-off control.

11 Claims, 10 Drawing Figures

Fig. 8.
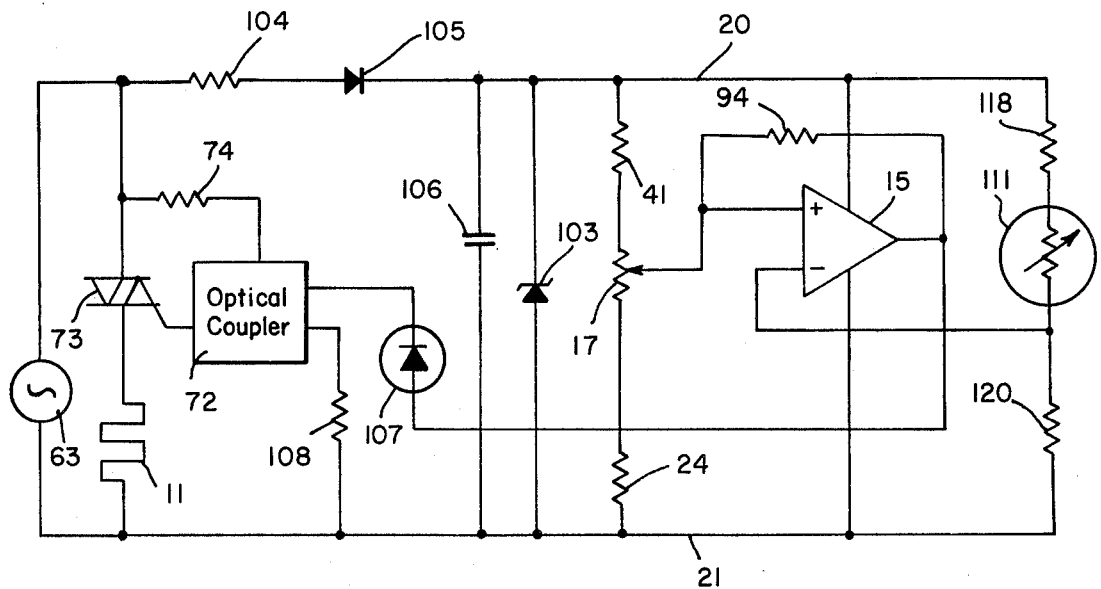
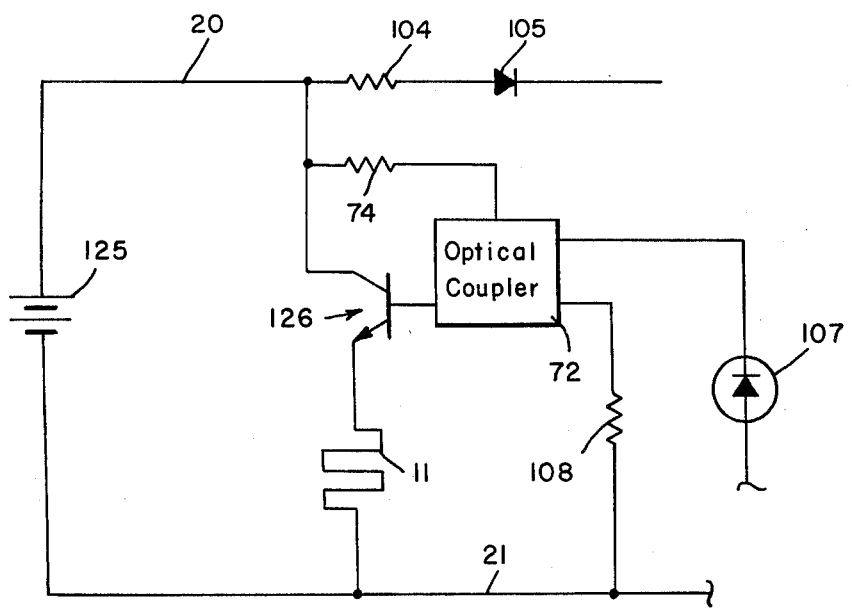
Fig. 9.

UNIVERSAL TEMPERATURE CONTROL CIRCUITS

CROSS-REFERENCE TO RELATED APPLICATION

The present application is related to an application filed Jan. 9, 1981, by Robert C. Griffith and Wayne A. Murray, Ser. No. 223,679. This application is assigned to the assignee of the present application, EDSYN, Inc. The present application discloses temperature control circuits which are more universal than those of the prior application and also discloses less sophisticated and hence more inexpensive circuits for various purposes.

BACKGROUND OF THE INVENTION

This invention relates generally to electronic control circuits and particularly to an electronic temperature control circuit.

It is generally desired to utilize different temperature sensors for sensing the temperature which may then be used for controlling a resistive heating element. Thus, it may be desired to utilize, besides the thermocouple to which the prior application is directed, other temperature sensors such as a resistive sensor or a thermistor. Furthermore, it is desirable to utilize either positive or negative temperature coefficient devices. A positive temperature coefficient simply means that the sensor's resistance increases with a rising temperature. A sensor having a negative temperature coefficient exhibits a resistance which decreases with rising temperature.

It is furthermore desirable to provide circuits which are capable of operating with different voltages which may be either alternating current or direct current voltages.

Besides controlling the temperature of a heater element, it is also possible to provide a digital display to compensate for variations of the temperature of the cold junction of a thermocouple and to compensate automatically for the nonlinearity of the sensor signal.

SUMMARY OF THE INVENTION

In accordance with the present invention, there are provided various electronic control circuits adapted for different purposes. All of these control circuits are characterized in that the temperature of an object is measured by a temperature sensor. The signal derived from the sensor is then utilized for controlling the temperature of a resistive heating element. Depending on the sophistication of the selected control circuit, it is feasible to exhibit digitally the measured temperature. The nonlinearity of the sensor output signal may be compensated for by varying the gain of an amplifier having a varying gain, or alternatively by utilizing a resistive heater element having such properties as to compensate for the nonlinearity of the sensor output. Proportional control may be achieved by an amplifier having a series of feedback circuits to provide proportionality and to stabilize the control loop. Alternatively, proportional control may be obtained by a heater having a low resistance at low temperatures and a rapidly increasing resistance as its temperature rises.

The anticipatory control is simply obtained by the provision of two temperature sensors, one being positioned at the end of the resistive heater which is first heated, while the other one measures the actual temperature of the object to be heated. Hence, the first sensor will anticipate the final desired temperature because it senses the temperature of the heater portion which is initially heated.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 8 is another electronic control circuit diagram, also utilizing a thermistor as a temperature sensor, as well as an optical coupler for separating the sensor circuit from the high power control circuit, and including a zero voltage switch;

FIG. 9 illustrates a modification of a portion on the circuit of FIG. 8, featuring a power transistor rather than a triac for controlling the heater and operating on direct current.

DESCRIPTION OF THE PREFERRED EMBODIMENTS

Figure 1:
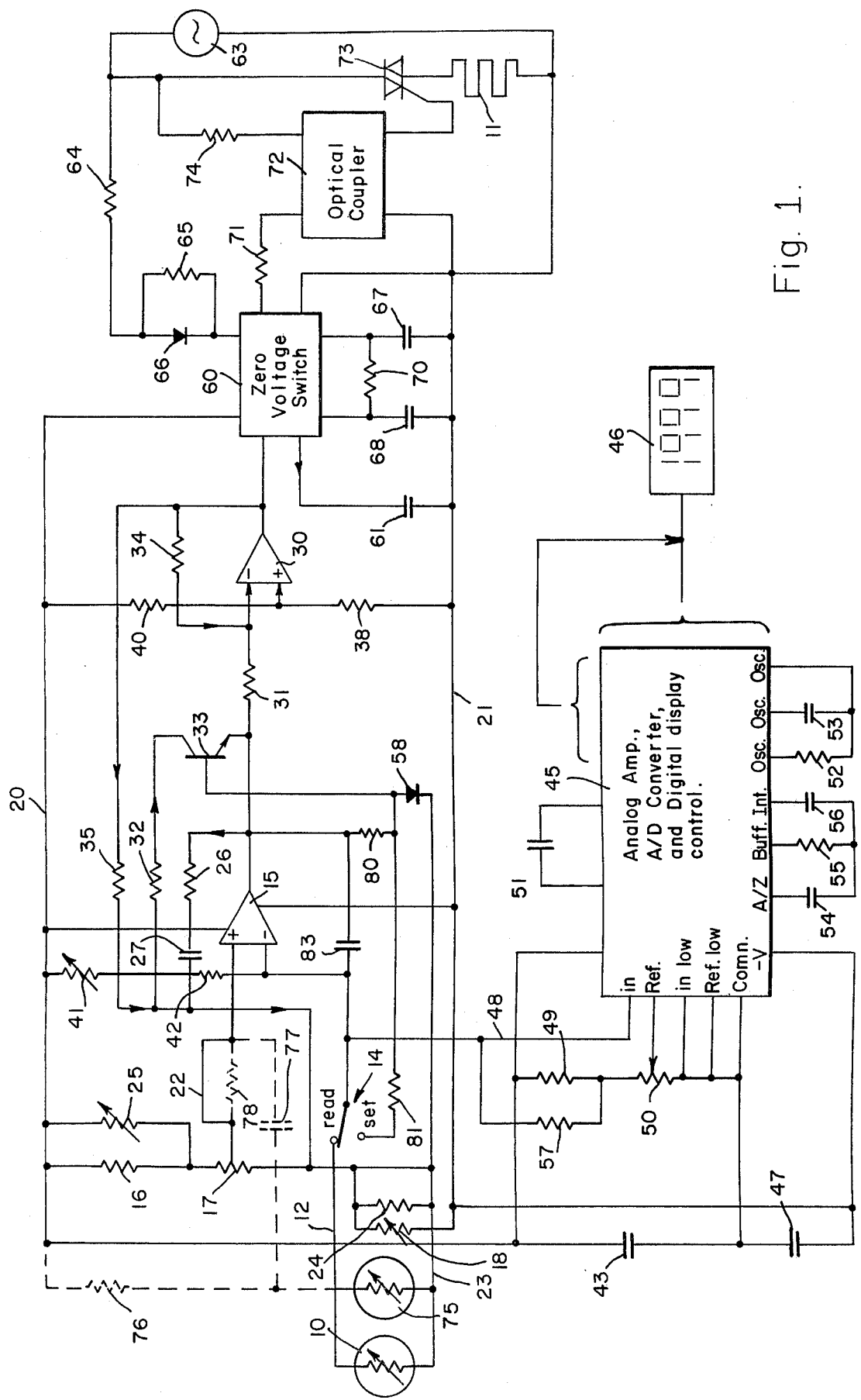
FIG. 1 is a circuit diagram showing, by way of example, one embodiment of the present invention which provides both proportional and anticipatory control and utilizes a resistive sensor.

Referring now to the drawings, and particularly to FIG. 1, there is illustrated by way of example an electronic control circuit embodying the present invention. The control circuit includes a temperature sensor 10 which, in the example of FIG. 1, is a resistive sensor. Such a sensor may, for example, consist of an alloy of iron and nickel, such as is readily available in the trade. Preferably such a resistive sensor may be obtained from the Fumi Electric Stock Holding Company. The resistive sensor 10 has a positive temperature coefficient. It is obtainable as one unit, together with a resistive heater element such as shown at 11 in FIG. 1. Since the sensor 10 is resistive, it does not generate a signal, but simply varies its resistance with temperature. One lead 12 from the temperature sensor 10 is connected to the "read" contact of a switch 14. When the read contact is closed, as shown in FIG. 1, the signal voltage feeds directly to the negative terminal of an amplifier 15, which may be connected as an operational amplifier. The positive terminal of amplifier 15 receives a voltage from a voltage divider including resistors 16, 17, and 18 connected in series between a positive voltage line 20 and a negative voltage line 21. The resistor 18 is adjustable as shown. A tap on resistor 17 feeds directly through the lead 22 into the positive terminal of the amplifier 15. There is no need to provide an impedance, such as a resistor between the sensor 10 and lead 12 to the amplifier 15, because the sensor is itself a high-impedance device.

Hence, the amplifier 15 operates as a comparator comparing a voltage determined by the tap on resistor 17 with the signal obtained from temperature sensor 10. Another lead 23 from the other terminal of the temperature sensor 10 is connected through a resistor 24 to the junction point between resistors 17 and 18. The sensor 10 forms part of a voltage divider network from line 20 through resistors 16, 17, and 24, sensor 10 to amplifier 15. Also, the resistor 16 may be bypassed by a resistor 25.

The output of the amplifier 15 is connected through an alternating current feedback path including a resistor 26 and capacitor 27 to the junction point between resistors 17 and 18. A second amplifier 30 has its negative input connected to the output of amplifier 15 by a current-limiting resistor 31. A second feedback path includes a resistor 32 and transistor 33 connected between the output of amplifier 15 and the junction point of resistors 17 and 18. The output of amplifier 30 is connected to the negative input thereof through a resistor 34. Furthermore, the output of the amplifier 30 is connected through a resistor 35 back to the junction point between resistors 17 and 18. A resistor 80 is connected between the output of amplifier 15 and the base of transistor 33.

The gain and phase of the network of amplifiers 15 and 30 must be controlled to provide stable operation of the temperature regulating loop. To this end the direct current gain of the amplifier circuitry is controlled by resistors 80 and 35. It is assumed that the impedance in parallel with resistor 80; that is, the impedance of transistor amplifier 33 may be considered to be negligable.

The alternating current gain is modified by the positive feedback through the impedance of capacitor 27 and resistor 26 in series and increases the phase margin of the over-all control loop. This will provide improved dynamic response.

This approach is selected to take advantage of the higher gain of the first amplifier stage 15, with the result that the size of capacitor 27 is reduced. In addition, the active feedback yields a better transient response.

A resistor 40 is connected in series with resistor 38 between the two voltage lines 20 and 21 to impress a fixed voltage on the positive terminal of amplifier 30.

Similarly, a variable resistor 41 and a fixed resistor 42 are connected in series between the positive voltage line 20 and the read terminal of switch 14 to impress a sensor signal plus an adjustable voltage on the negative terminal of amplifier 15.

It will be noted that the three feedback paths 20, 27; 32, and 35 between amplifiers 15 and 30 provide proportional control of the sensor signal.

A capacitor 43 is connected between the positive voltage line 20 and the common terminal of a unit 45 which represents a variable gain analog amplifier, an analog to digital converter and a digital display control, the digital display being shown at 46.

Another capacitor 47 is connected between the common terminal of the unit 45 and the negative voltage input terminal. The two capacitors 43 and 47 are simply filter capacitors. A lead 48 impresses the temperature sensor voltage signal on the "in" terminal of the unit 45. The "reference" terminal of the unit 45 is supplied with a fixed voltage from the positive voltage line 20 through resistors 49, 50 connected in series through a tap on the resistor 50, the other end of which is tied to the "in low" terminal, the "reference low" terminal and the "common" terminal of the unit 45. The gain of the analog amplifier indicated in unit 45 is set by the tap on resistor 50. A capacitor 51 is also connected to the unit 45 and serves as a filter for the reference high.

In addition, the "oscillator" terminals of the unit 45 are connected to an RC circuit including a resistor 52 and capacitor 53 connected in parallel. A capacitor 54 is an "auto zero" capacitor, resistor 55 is connected to the "buffer" input and operates as an integrating resistor together with an integrating capacitor 56.

For a more detailed explanation of the operation of unit 45, reference is made to the above-identified co-pending application of Griffith, et al.

The unit 45 also controls the digital display 46.

Another feedback path for the unit 45 is provided by resistor 57, connected between the junction of resistors 49 and 50, and the "in" terminal of the unit 45. This provides a feedback path for the bias impressed on the "in" terminal. This bias controls the gain of the variable analog amplifier indicated in unit 45 and compensates for the nonlinearity of the output signal derived from the temperature sensor 10. A diode 48 is connected between the base of transistor 33 and lead 23. It serves the purpose to compensate for any variations of the voltage across transistor 33.

A unit 60 is connected to the output of operational amplifier 30 and operates as a zero voltage switch. To this end, a filter capacitor 61 is connected between one of the outputs of the unit 60 into negative voltage line 21.

The device 60 operates in response to the tips of the sawtooth waves generated by the amplifier 30, as shown, which are above a horizontal reference line. Another terminal of the unit 60 is connected to an alternating voltage source 63 through a pair of resistors 64 and 65. The resistor 65 is bypassed by a diode 66 to normally feed into the zero voltage switch 60 a half wave of the sine wave generated by the generator 63. The high resistance resistor 65 serves the purpose to apply to the zero voltage switch 60 a complete sine wave reference. A capacitor 67, connected between one output of the voltage source 63 and the low voltage lead 21, serves as a power supply filter. A capacitor 68 and a resistor 70 connected between the two capacitors form a time constant network for providing the timing on the ramp wave previously referred to. The capacitor 61 provides pulse width control.

A resistor 71 connects the output of the zero voltage switch 60 to an optical coupler 72. The unit 72 is connected across a triac 73 and a resistor 74 in series. The triac 73 and the heater element 11 are connected in series across the alternating current source 63.

Hence, optical coupler 73, resistors 64, 65, diode 66, triac 73 and heater element 11 are energized by alternating current. The direct current is applied by the optical coupler 72 to resistor 71 and switch 60 to direct current voltage lines 20, 21.

The method of effecting efficient heat transfer away from the circuit and from a closed handle which may house the electronics is an important feature of the present invention. This heat transfer applies to all embodiments of the present invention shown in FIGS. 1 to 10. To this end the triac 73 and voltage dropping resistor 64 are located together and adjacent the power leads from the alternating current source 63. This will keep the power semiconductor 73 within safe operating limits. This is particularly important at low input voltages which cause the flow of high currents to heat up the large current carrying elements. Thus, the flow of heat from the resistor 64 is conducted to the triac, its M2 tab, and then out of the handle through the copper leads of the power cord.

In order to set the desired temperature, the switch 14 is rotated from the "read" to the "set" contact. In this case the negative terminal of the amplifier 15 is connected through resistors 80 and 81, connected in series to the output thereof. A capacitor 83 serves as a filter capacitor between the negative input terminal and the output terminal of amplifier 15. Once the temperature has been set by the tap on resistor 17, the switch 14 is returned to its "read" terminal.

The circuit as described so far provides proportional control, due to the feedback paths of the two amplifiers 15 and 30. In order to provide anticipatory control, it may be desired to provide a second temperature sensor 75. The second sensor 75 is connected between the lead 23 and the positive voltage lead 20 through a resistor 76. As shown by the dotted lines, the sensor 75 and resistor 76 are optional. The junction between sensor 75 and resistor 76 may be connected by a capacitor 77 to the positive terminal of amplifier 15. In this case, the lead 22 should be omitted and replaced by a resistor 78.

As indicated before, the sensor 75 may be put in the neighborhood of the heater 11. Thus, that portion of the heater which is first heated will provide an anticipation of the temperature of the object to be heated.

Thus, the circuit of FIG. 1 features a resistive sensor having a positive temperature coefficient and proportional control, as well as optional anticipatory control.

It will be understood that the circuit specifications of the electronic circuit of FIG. 1 may vary according to the design for any particular application. The following circuit specifications are included by way of example only.

TABLE 1

| Sensors 10 and 75 | Resistive temperature sensors with positive temperature coefficient |
|---|---|
| Resistor 16 | 68 K |
| Resistor 17 | 200 ohms |
| Resistor 18 | to be set at test |
| Resistor 24 | 330 ohms |
| Resistor 25 | to be set at test |
| Resistor 78 | 1 megohm |
| Resistor 41 | to be set at test |
| Resistor 42 | 62 K |
| Resistor 57 | 2 K |
| Resistor 49 | 8.2 K |
| Resistor 50 | 100 ohms |
| Resistor 35 | 100 K |

TABLE 1-continued

| Resistor 32 | 470 K |
|---|---|
| Resistor 26 | 220 K |
| Resistor 80 | 100 K |
| Resistor 81 | 100 K |
| Resistor 40 | 15 K |
| Resistor 31 | 30 K |
| Resistor 38 | 15 K |
| Resistor 34 | 15 K |
| Resistor 70 | 2.2 megohms |
| Capacitor 77 | 0.1 microfarad |
| Capacitor 43 | 0.1 microfarad |
| Capacitor 47 | 0.1 microfarad |
| Capacitor 83 | 0.01 microfarad |
| Capacitor 27 | 4.7 microfarad |
| Capacitor 51 | 1.0 microfarad |
| Capacitor 54 | 1.0 microfarad |
| Capacitor 56 | 0.22 microfarad |
| Capacitor 53 | 100 picofarads |
| Capacitor 61 | 0.0022 microfarad |
| Capacitor 68 | 0.22 microfarad |
| Capacitor 67 | 150 microfarad |
| Amplifiers 15 and 30 | each ½ LM 358 |
| Transistor 33 | type 2N 4401 |
| Diode 58 | type 1N 4148 |
| Diode 66 | type 1N 5054 |
| Voltage source 63 | 24 volt AC |
| Unit 60 | SL 441A |
| Unit 72 | MOC 3011 |

The remaining FIGS. 2 through 10, which will now be described, are more or less similar to the circuit of FIG. 1. Accordingly, the same elements have been designated by the same reference numerals.

It should be noted that none of the circuits of FIGS. 2 through 10 are provided with the particular proportional control circuitry of FIG. 1. Nevertheless, all of the circuits of FIGS. 2 through 10 provide some form of proportional control, as will be discussed hereinafter.

Figure 2:
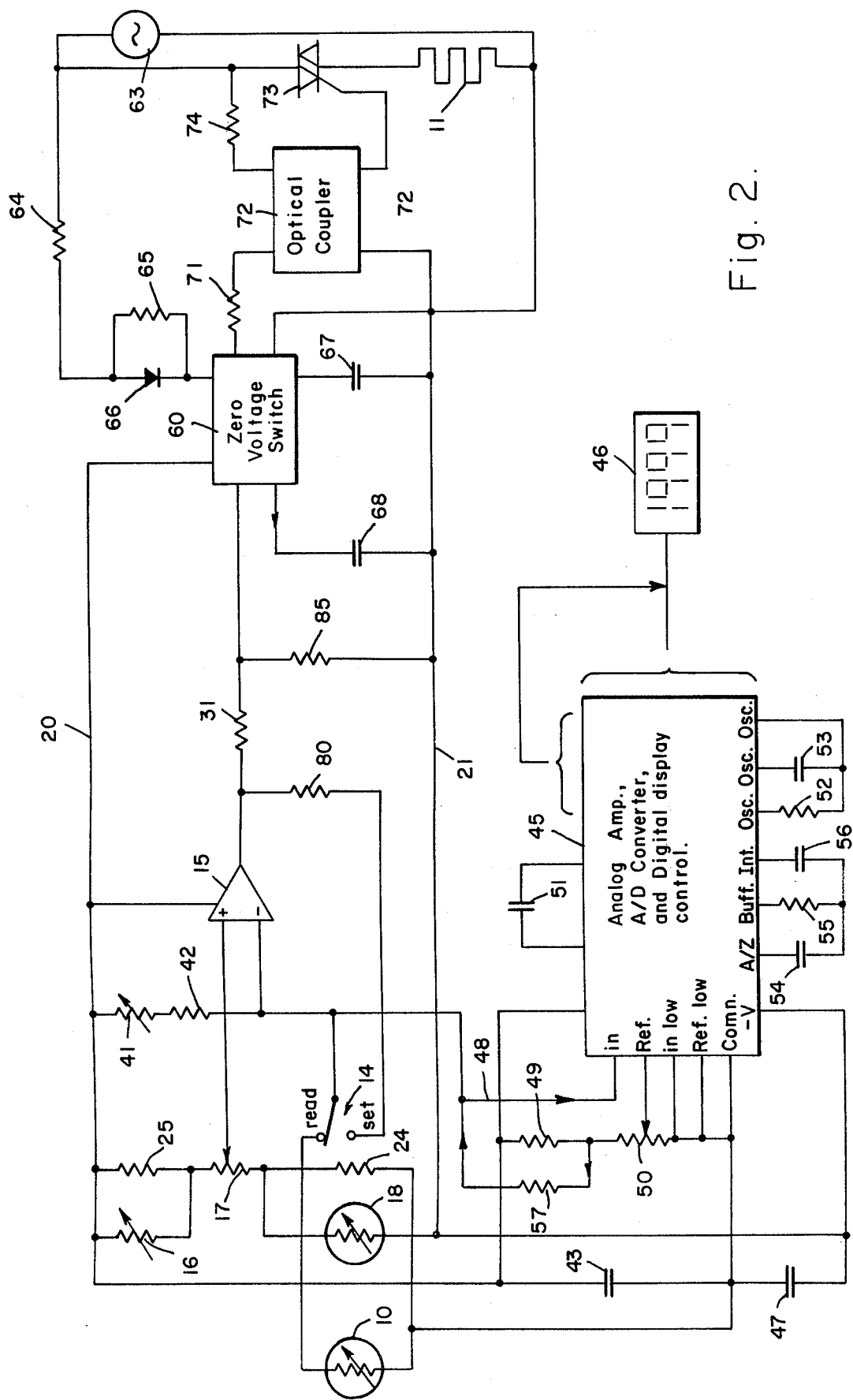
FIG. 2 is an electronic circuit diagram similar to that of FIG. 1 but substantially simplified and without the proportional control of the circuit of FIG. 1, and also utilizing a resistive sensor.

Referring now specifically to FIG. 2, there is illustrated a somewhat simplified circuit compared to that of FIG. 1. Thus, the second operational amplifier 30 has been omitted, as well as the three feedback paths between the two amplifiers 15 and 30. Accordingly, the circuit of FIG. 2 does not strictly feature a proportional control, but simply an on-off control for controlling the temperature of the heater 11. Furthermore, the second sensor element 75 of FIG. 1, which provides anticipatory control, has been omitted. The circuit of FIG. 2 additionally includes a resistor 85 connected between the negative voltage line 21 and the junction point of resistor 31 and voltage switch 60. This resistor permits current flow from the amplifier 15 through resistors 31 and 85 to the negative voltage lead 21.

In this circuit the resistive sensor 10 and heater element 11 both have a positive temperature coefficient and preferably are disposed in a single unit. The heater element 11 may have the property that its resistance is low at low temperatures but rises rapidly at high temperatures. Hence, the heater 11, will, in a manner, provide proportional control because it will cause the temperature to approach the set rates asymptotically. The same type of heater may be used in the circuits of FIGS. 3 to 10. With the omissions noted, the circuit of FIG. 2 operates like that of FIG. 1, and the following table shows the values of the new components.

TABLE 2

| Resistor 85 | 1 K |
|---|---|
| Resistor 31 | 20 K |

Figure 3:
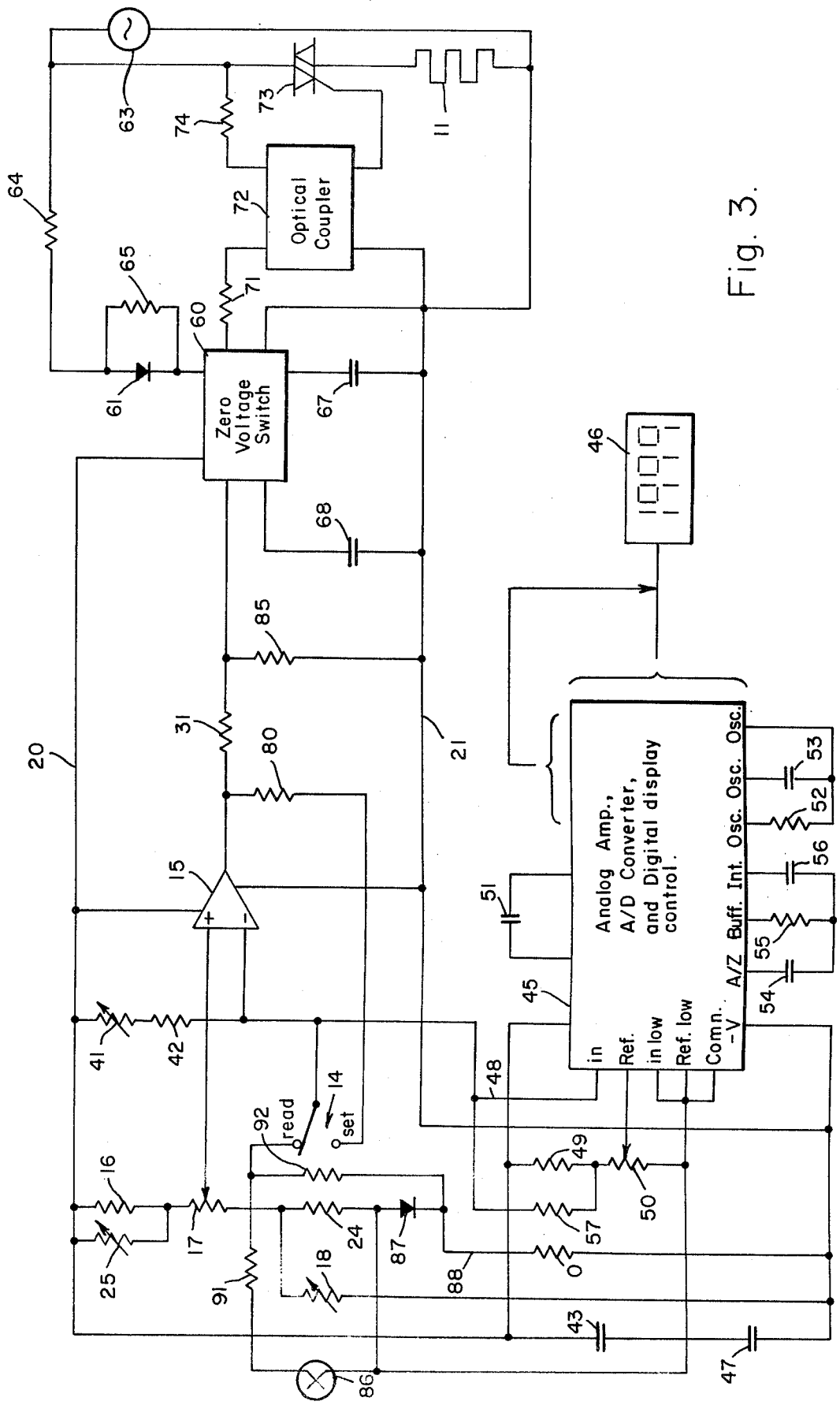
FIG. 3 is an electronic circuit diagram somewhat similar to that of FIG. 1, but featuring a thermocouple and simple on-off control, but with the addition of a diode for compensating for variations of the temperature of the thermocouple's cold junctions.

The circuit of FIG. 3 also provides only an on-off control like that of FIG. 2, and features a thermocouple 86 as the temperature sensor which generates a temperature signal. A thermocouple provides a variable voltage and exhibits a positive temperature coefficient. Since the thermocouple 86 has two cold junctions, and since the output signal varies with the temperature of the cold junctions, it is conventional to keep the cold junction at a fixed temperature, such as that of ice. However, the variations of the signal due to changes of the temperature of the cold junctions are compensated for by the provision of a diode 87. The diode is connected between resistor 24 and the lead 88, which is connected to the negative voltage terminal of the unit 45 through resistor 90. The other terminal of the thermocouple 86 is connected to the "read" contact of switch 14 by a resistor 91. A resistor 92 directly connects the "read" contact of switch 14 to resistor 90.

The diode 87 should be in proximity of the cold junction of the thermocouple 86 and subject to the temperature variations of the cold junctions. Hence, the diode 87 will vary the signal obtained from the thermocouple 86, which is impressed through resistor 92 on the "read" terminal of switch 14 and hence on the negative terminal of amplifier 15. The resistor 91 is a current-limiting resistor controlling the signal current applied to the amplifier 15. It should be noted that resistors 16, 17, and 24, diode 87 and resistor 90 form a voltage divider between the positive voltage lead 20 and the negative voltage applied to unit 45.

Otherwise, the circuit of FIG. 3 operates essentially like that of FIG. 2. It should also be noted that the thermocouple 86 has a positive temperature coefficient.

Again, the circuit values of the components of FIG. 3 having the same reference numerals are the same as those of FIG. 2. The following are the values of the new components.

TABLE 3

| Diode 87 | type 1N 4148 |
|---|---|
| Resistor 90 | 30 K |
| Resistor 91 | 330 ohms |
| Resistor 92 | 15 K |

FIGS. 4 through 10 have been further simplified in that they do not provide a digital readout as do the circuits of FIGS. 1, 2, and 3. Accordingly, the unit 45 and digital readout 46 have been omitted. Since the variable gain amplifier included in the unit 45 and the feedback resistor 57 linearize the sensor signal, these circuits of FIGS. 4 through 10 do not compensate for the nonlinearity of the sensor output. Thus, reference is now made to FIG. 4, which features a sensor 100 having a positive temperature coefficient such as the resistive sensor 10 of FIG. 1. Also, the circuit of FIG. 4 has only a single amplifier 15. The zero voltage switch is included in the optical coupler 72.

The circuits of FIGS. 4 through 9 feature a simple form of proportional control. This proportional control is provided by the positive feedback resistor 94 connected between the output of amplifier 15 and its positive input. The feedback resistor 94 is used for switching hysteresis and for providing proportional control. The actual value of resistor 94 is determined by the thermal characteristics of the heater 11 and its value may range from 100 K to 100 megohms.

Although FIGS. 4 through 10 do not show a digital temperature display, it will be understood that such a display may be added, as in FIGS. 1 through 3.

The sensor 100 is in series with the resistor 42 between the two positive and negative lines 20, 21. The junction point between resistor 42 and sensor 100 is connected to the negative input terminal of amplifier 15. Hence, the voltage varies with the temperature. The positive terminal of amplifier 15 receives a fixed voltage through the tap on resistor 17, which is compared to the sensor voltage.

Unit 101 represents a voltage regulator. The voltage on the other side of the voltage regulator, as shown by lead 102, is maintained at a substantially fixed value by zener diode 103, which is connected between the positive voltage lead 102 and the negative voltage lead 21. An alternating current source 63 is connected across triac 73 and heater element 11. A resistor 104 and diode 105 are connected in series between the voltage regulator 101 and the voltage source 63. The diode 105 operates as a rectifier, and the resistor 104 controls the input voltage. A capacitor 106 is a filter capacitor connected between voltage leads 102 and 21.

The output of the amplifier 15 is connected through a light-emitting diode (LED) 107 to the optical coupler and zero voltage switch 72. Its other input is grounded through a resistor 108.

It should be noted that unit 72 in FIGS. 4 to 10 indicates a driver, zero voltage switch, and an optical coupler. The triac driver 72 includes a zero voltage switch and an optical coupler, to separate the high power output of the circuit including triac 73 and heater element 11, from the low power portion of the circuit to the right of driver 72 and diode 105. The LED 107 lights up to indicate that the circuit is operating.

Figure 4:
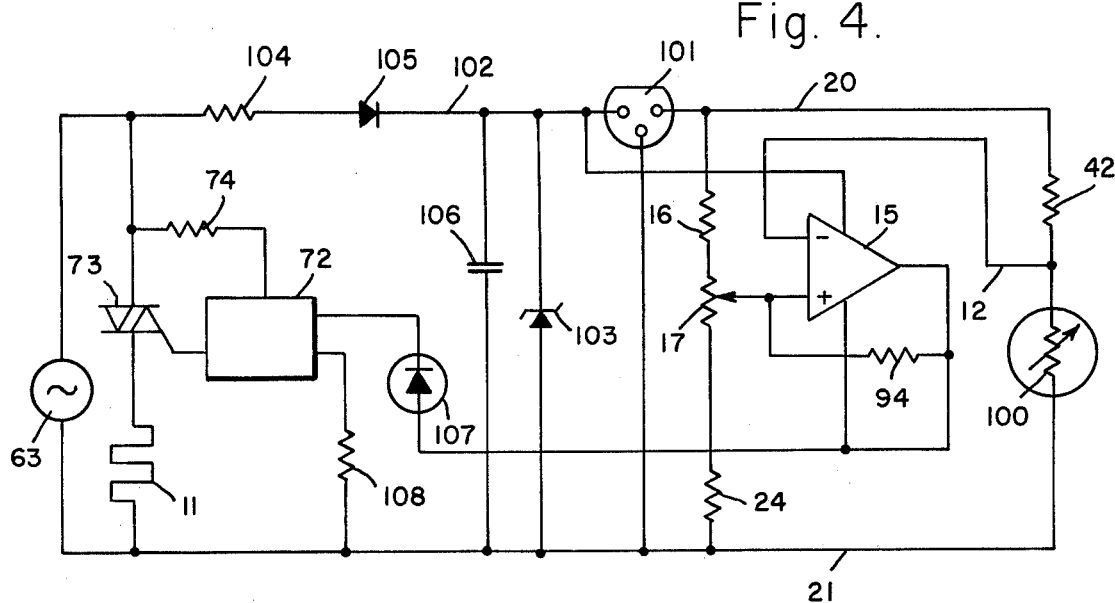
FIG. 4 is an electronic circuit diagram generally similar to the previous ones but considerably simplified and utilizing a sensor having a positive temperature coefficient and a light-emitting diode (LED) to indicate whether the circuit is in operation.
Figure 5:
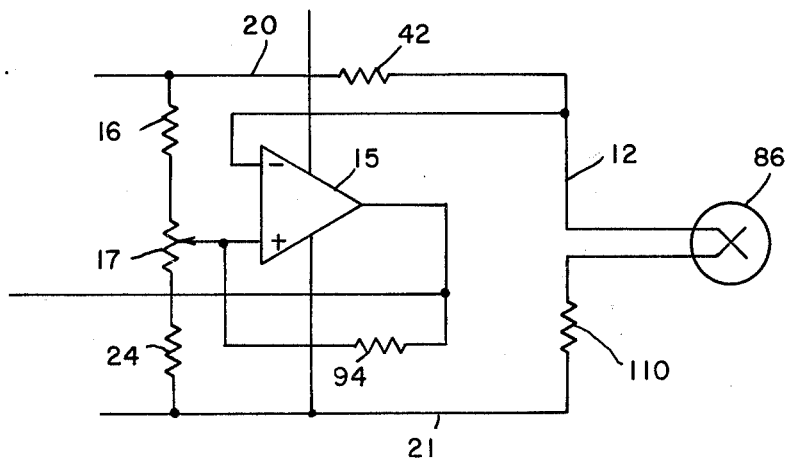
FIG. 5 shows a portion of another modification of the circuit of FIG. 4, for adapting it to the use of a thermocouple.

FIG. 5 shows a modification of the circuit of FIG. 4, in that a thermocouple 86 is substituted for the resistance sensor 100. In this case a resistor 110 is connected between the thermocouple 86 and the voltage line 21, while a resistor 42 is connected between the other lead of the thermocouple 86 and the positive voltage line 20. The junction between resistor 42 and thermocouple 86 feeds the sensor signal to the negative terminal of the amplifier 15. Otherwise, the circuit of FIG. 5 is identical to that of FIG. 6.

Figure 6:
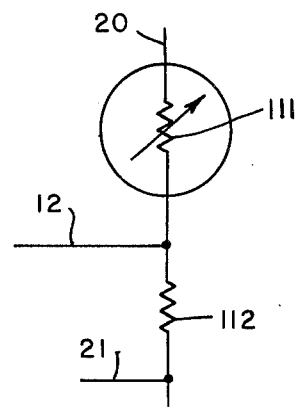
FIG. 6 shows a portion of the circuit of FIG. 4 modified for the use of a thermistor temperature sensor having a negative temperature coefficient.

Still another modification is shown in FIG. 6, where a negative temperature coefficient sensor is used; namely, a thermistor 111. The thermistor 111 is connected between the positive voltage lead 20 and a resistor 112, which in turn is connected to the negative voltage lead 21. The lead 12 connected to the junction point of negative temperature coefficient sensor 111 and resistor 112 again feeds into the negative terminal of amplifier 15.

The circuit constants of the circuit of FIG. 4 are shown in the following table.

TABLE 4

| Resistor 104 | 180 ohms |
|---|---|
| Resistor 74 | 36 ohms |
| Resistor 108 | 1.1 K |
| Resistor 16 | 100 K |
| Resistor 17 | 1 K |
| Resistor 24 | 910 ohms |
| Resistor 42 | 16 K |
| LED 107 | |
| Capacitor 106 | 45 microfarad |
| Diode 105 | type 1N 4148 |
| Zener diode 103 | type 1N 4747 |
| Voltage source 63 | 12-24v AC |

TABLE 4-continued

| | |
|---|---|
| Voltage regulator 101 | +20v left |
| | +8v right |
| Unit 72 | MOC 3030 |

The circuit of FIG. 4 may also be operated with different input voltages, which will change the values of resistors 74 and 104 only, as shown in the following table.

TABLE 5

| | | |
|---|---|---|
| Voltage source 63 | 120v AC | 230v Ac |
| Resistor 74 | 180 K | 360 ohms |
| Resistor 104 | 6.0 K | 12 K |

For the circuit of FIG. 5, values are the following:

TABLE 6

| | |
|---|---|
| Resistor 16 | 390 K |
| Resistor 17 | 1 K |
| Resistor 24 | 200 ohms |
| Resistor 42 | 240 K |
| Resistor 110 | 200 ohms |

Finally, for the circuit of FIG. 6:

TABLE 7

| | |
|---|---|
| Resistor 112 | 20 K |

Figure 7:
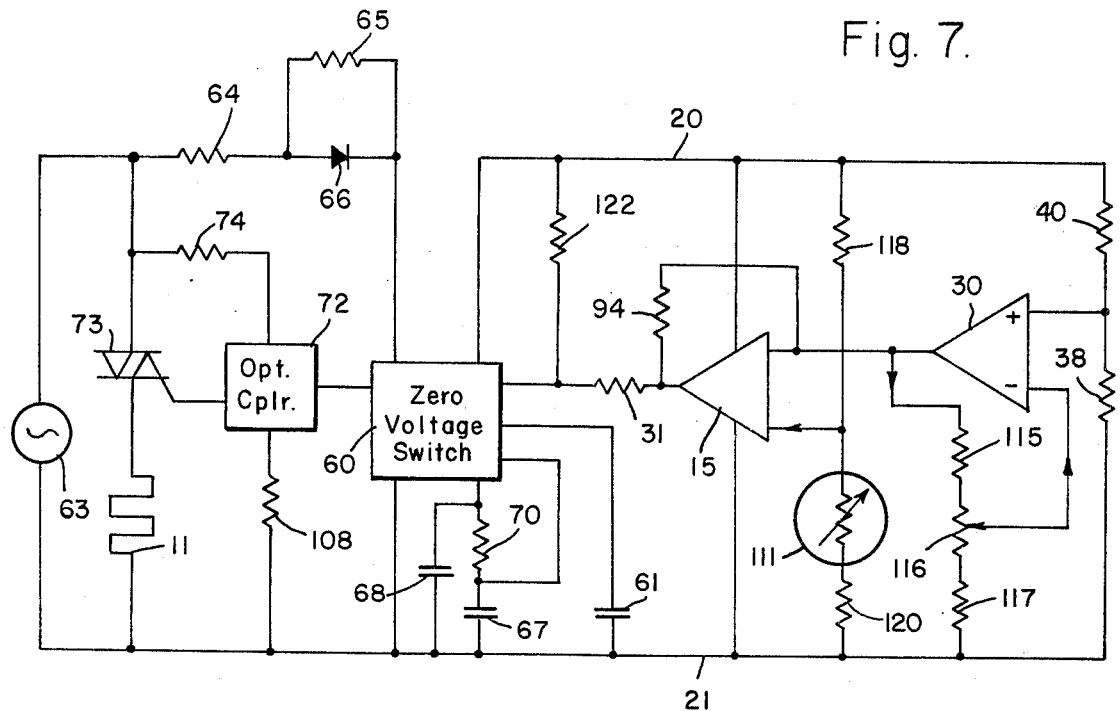
FIG. 7 shows another electronic circuit diagram utilizing a thermistor and featuring linear compensation for the thermistor's resistance and control of the duty cycle for the resistive heating element.

The circuit of FIG. 7 features linear compensation of the thermistor resistance temperature curve, as well as control of the duty cycle for the heater element 11. To this end the circuit of FIG. 7 again includes two operational amplifiers 15 and 30, amplifier 30 being connected as a logarithmic amplifier due to its negative feedback. To this end the output of amplifier 30 is connected to the negative voltage line through a voltage divider including resistors 115, 116, and 117. These three resistors 115–117 control the amplifier gain. The feedback is from the output of amplifier 30 through the tap on resistor 115 back to the negative input terminal of the amplifier 30. The positive input terminal of amplifier 30 receives a voltage from the junction point between resistors 38 and 40, providing a voltage divider network.

The thermistor 111, which serves as a temperature sensor, forms part of a voltage divider network including a resistor 118, followed by the thermistor 111 and a resistor 120, connected in series between the positive and negative voltage lines 20 and 21. Hence, the amplifier 15 is a voltage comparator, comprising the signal impressed on its negative input terminal from the junction point between resistor 118 and thermistor 111 and the output of amplifier 30 impressed on its positive input terminal.

The purpose of the logarithmic amplifier 30 is to straighten out the thermistor output signal, which is normally highly nonlinear, and to provide for a more linear temperature scale. The latter is particularly important for setting a desired temperature.

The zero voltage switch 60 generates a ramp wave, as shown, controlled by the time constant of resistor 70 and capacitor 67. A resistor 122 is connected between the positive voltage line and the resistor 31 to form a voltage divider. A horizontal reference line passes through the ramp wave, and the zero voltage switch will pass the peaks of the ramp above the reference line. The resistor 70 and capacitor 67 provide the timing of the ramp wave. Pulse width control is provided by the capacitor 61. Capacitor 68 is the power supply filter capacitor.

The output voltage of voltage source 60 is controlled by a current-limiting resistor 64 and is half-wave rectified by the rectifier 66 connected to the zero voltage source 60. A large value resistor 65 may supply the other half of the alternating current wave, which is passed by the zero voltage switch 60 to the driver 72.

In order to reduce the duty cycle for the heater 11, the resistor 65 may be omitted so that only the halve wave of the alternating current passes through the heater element 111.

The driver 72 controls the triac 73, as previously explained. The circuit constants of the circuit of FIG. 7 are given in the following table.

TABLE 8

| | |
|---|---|
| Voltage source 63 | 24v AC |
| Resistor 70 | 1.5 megohms |
| Resistor 31 | 9 K |
| Resistor 108 | 820 ohms |
| Resistor 65 | 100 K |
| Resistor 115 | 2 K |
| Resistor 116 | 20 K |
| Resistor 117 | 910 ohms |
| Resistor 118 | 200 K |
| Resistor 120 | 2 K |
| Resistor 122 | 200 K |
| Resistor 64 | 560 ohms |
| Resistor 74 | 36 ohms |
| Diode 66 | type 1N 5054 |

For voltage source 63 at 120 v AC and at 230 v AC, the following resistance values are changed:

TABLE 9

| | | |
|---|---|---|
| Voltage source 63 | 120v AC | 230v AC |
| Resistor 64 | p 6 K | 12 K |
| Resistor 74 | 180: ohms | 390 ohms |

FIG. 8 shows a circuit which is substantially simplified compared to that of FIG. 7. Both the logarithmic amplifier 30 and the zero voltage switch 60 of FIG. 7 have been omitted. Also, the voltage regulator of FIG. 4 has been omitted. The circuit features a thermistor 111 as a temperature-sensing element.

Thus, the amplifier 15 is a voltage comparator comparing the voltage obtained from the voltage divider 41, 17, 24, with the temperature signal derived from the junction point of resistor 118 and thermistor 111. A resistor 120 completes the voltage divider 118, 120 and 118 between voltage lines 20 and 21. Again, an LED 107 is provided to indicate that the circuit is in operation. Otherwise, the circuit operates essentially like that of FIG. 4, except that the voltage regulator 101 has been omitted. The zero voltage switching function is included in the optical coupler 72.

The circuit constants of the circuit of FIG. 8 energized by 24 v AC are as follows:

TABLE 10

| | |
|---|---|
| Resistor 104 | 560 ohms |
| Resistor 74 | 36 ohms |
| Resistor 108 | 2 K |
| Resistor 41 | 2 K |
| Resistor 17 | 20 K |
| Resistor 24 | 1.5 K |
| Resistor 118 | 20 K |
| Resistor 120 | 470 ohms |
| Capacitor 106 | 47 microfarads |

In all of the previous circuits; that is the circuits of FIGS. 1 through 8, the heater element 11 has been driven by a triac, which requires an alternating current. In accordance with the present invention, it is also feasible to operate the heater element 11 without a triac and with a direct current. This is shown in FIG. 9, showing only the modified portion of the circuit of FIG. 8, and to which reference is now made.

Thus, the positive and negative voltage lines 20 and 21 are energized by direct current, such as obtained from a battery 125. A power transistor 126 is connected between the positive voltage line 20 and the heater element 11 to energize it. The driver 72 is connected to the base of the transistor 126 for the purpose of causing it to conduct.

Although the circuit of FIG. 9 is operated with direct current, the rectifier 105 plays a useful role. It is used as a steering diode in case the input power lead should be accidentally connected in the reversed polarity, thus preventing damage to the circuit. The zener diode 103 and filter capacitor 106 (see FIG. 8) are used to provide a stable reference voltage for the comparator in spite of fluctuating battery voltage and gradual drainage of the battery 125.

The following table shows the values of the circuit constants of FIG. 9 which are different from the circuit of FIG. 8.

TABLE 11

| Battery 125 | 24v DC |
|---|---|
| Resistor 108 | 1.2 K |

Figure 10:
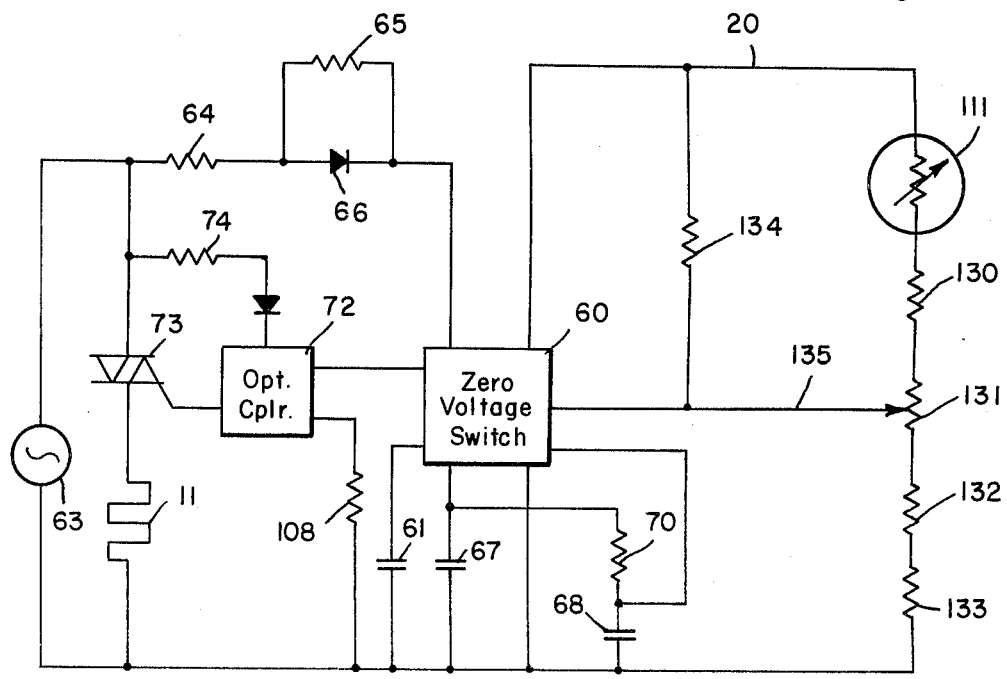
FIG. 10 is still another electronic circuit diagram including a thermistor as a temperature sensor, which in turn controls the direct current cut-off level of a ramp generator and provides proportional control.

It is also feasible, as illustrated in FIG. 10, to provide a thermistor sensor and proportional control without the use of the three feedback paths and additional amplifier 30 of the circuit of FIG. 1. Furthermore, the amplifier 15 has been omitted. The thermistor 111 is connected between the positive voltage line 20 and the negative voltage line 21 through resistors 130, 131, 132, and 133, which jointly form a voltage divider. A tap on resistor 131 feeds to zero voltage switch 60. Another resistor 134 is connected between the positive voltage line 20 and the line 135 which connects the tap on resistor 131 to the unit 60. Hence, the thermistor 111 forms part of the voltage divider which feeds the signal into the voltage switch 60, which operates in the manner previously explained.

The proportional control is obtained in that the heater element 11 again has a temperature characteristic so that at low temperatures its resistance is low, while it increases rapidly with increasing temperatures. This will, again, approach the set temperature asymptotically, as previously explained. Thus, in the circuit of FIG. 10, the thermistor 111 directly controls the direct current cut-off level of the ramp wave.

The following table again lists the circuit constants of those components which have not previously been listed.

TABLE 12

| Voltage source 63 | 24v AC |
|---|---|
| Resistor 130 | 2 K |
| Resistor 131 | 20 K |
| Resistor 132 | 27 K |
| Resistor 133 | 1 K |
| Resistor 134 | 820 K |
| Resistor 64 | 560 ohms |
| Resistor 65 | 100 K |
| Resistor 74 | 36 ohms |

TABLE 12-continued

| Resistor 108 | 820 ohms |
|---|---|

The values of resistors 64 and 74 must be changed for different input voltages, as shown below.

TABLE 13

| Voltage source 63 | 115v AC | 230v AC |
|---|---|---|
| Resistor 64 | 6 K | 12 K |
| Resistor 74 | 180 ohms | 360 ohms |

There have thus been described various electronic circuits for controlling the temperature of a heating element, for providing a digital display of the actual temperature, for compensating for the nonlinearity of the temperature sensor signal and for compensating for variations of the cold junctions of a thermocouple. The circuits permit the use of temperature sensors having either a negative or a positive temperature coefficient. Thus, the sensors may be of the resistive type, they may consist of a thermocouple or a thermistor. The circuits may operate with a proportional control, with the addition of anticipatory control, or with a simple on-off control. The circuits may be operated with any alternating current input, the alternating voltages of 24 or 120 or 230 volts being shown by way of example only. From the examples given, it will be evident that other voltages may be used by changing the values of only two resistors. Alternatively, the circuits may even be operated with a direct current input, such as a battery. The circuits vary from highly sophisticated to very simple and inexpensive circuits.

What is claimed is:

1. An electronic circuit for generating a digital output signal in response to the measured temperature of an object comprising:
   (a) a temperature sensor for sensing the temperature of the object and generating a voltage signal representative of the temperature and varying non-linearly with temperature;
   (b) an analog amplifier having a gain which varies with an applied reference voltage and having a reference and an input terminal;
   (c) means for applying said voltage signal directly on said input terminal of said analog amplifier;
   (d) a first operational amplifier acting as a comparator and having a positive and a negative input terminal;
   (e) a sound operational amplifier having a positive and a negative input signal;
   (f) a first negative feedback including a first resistor connected between the output and negative input of said second operational amplifier;
   (g) a second, third, and fourth positive feedback for said first operational amplifier including a second resistor connected to the output of said second operational amplifier, a third feedback for said first operational amplifier including a third resistor and capacitor in series connected to the output of said first operational amplifier, a transitor having its emitter and collector connected between the output of said first operational amplifier in series with a fourth resistor, the free ends of said second, third, and fourth feedbacks being connected to a common summing point coupled in turn to the positive input terminal of said first operational amplifier, the base of said transistor being coupled to the output of said first operational amplifier and to said sensor;

(h) a first voltage divider network coupled to the positive input of said first operational amplifier, and said common summing point being connected to said first voltage divider network, whereby the voltage applied to the positive input of said first operational amplifier varies with the voltage signal;

(i) means for impressing said voltage signal directly on the negative input terminal of said first operational amplifier and on the base of said transistor;

(j) means for applying an adjustable reference voltage on said input terminal of said analog amplifier and including feedback means between said reference and input terminals of said analog amplifier to generate a substantially linear analog signal impressed on said analog amplifier; and (k) an analog-to-digital converter coupled to said analog amplifier to generate a digital output signal suitable for a digital temperature display.

2. A circuit as defined in claim 1 wherein a heater element is provided and means coupled to said second operational amplifier for controlling current flow through said heater element in accordance with the set temperature measured by said sensor.

3. A claim as defined in claim 2 wherein said sensor is a resistive sensor.

4. A circuit as defined in claim 2 wherein said heater has a positive temperature coefficient, thereby to provide effective proportional control.

5. A circuit as defined in claim 2 wherein said sensor is a thermocouple, and a resistive element connected between said thermocouple and said negative input terminal of said first operational amplifier, and a voltage switch and a voltage sensor including an optical coupler connected between said operational amplifier and said heater element.

6. A circuit as defined in claim 2 wherein a voltage source is connected across said heater element and said means, a voltage dropping resistor and said means coupled to said operational amplifier are connected in series and directly connected to the leads of said voltage source, thereby to provide an effective heat transfer for said triac and voltage dropping resistor.

7. A circuit as defined in claim 2 wherein said resistive element is a heater element coupled to said driver, and a voltage source and an electric switch controlled by said switch and driver, thereby to energize said heater in response to said output pulses.

8. A circuit as defined in claim 6 wherein said voltage source is an alternating current voltage source and a rectifying network is provided between said voltage source and said resistive network.

9. A circuit as defined in claim 1 wherein a switch is provided having a read and set terminal and a switch arm movable to either switch terminal, said read terminal connecting said sensor directly to the negative input of said first operational amplifier, and said set terminal disconnecting said sensor, and a network connecting said terminal to said reference and input terminals of said analog amplifier to provide an output signal representative of a set voltage adjusted on said voltage divider network regardless of the output voltage of said sensor, while said read terminal connected in the circuit will provide a digital output voltage representative of the actual temperature of said object.

10. A circuit as defined in claim 9 wherein a digital display is coupled to said analog-to-digital converter to display either the set temperature or the read temperature.

11. An electronic circuit for generating a digital output signal in response to the measured temperature of an object comprising:

(a) a temperature sensor for sensing the temperature of the object and generating a voltage signal representative of the temperature and varying non-linearly with temperature;

(b) an analog amplifier having a gain which varies with an applied reference voltage and having a reference and an input terminal;

(d) a first operational amplifier acting as a comparator and having a positive and a negative input terminal;

(e) means for directly impressing said voltage signal on the negative input terminal of said first operational amplifier and on the input terminal of said analog amplifier;

(f) means for applying an adjustable reference voltage on said input terminal of said analog amplifier and including feedback means between said reference and input terminals of said analog amplifier to generate a substantially linear analog signal impressed on said analog amplifier;

(g) an analog-to-digital converter coupled to said analog amplifier to generate a digital output signal suitable for a digital temperature display;

(h) a switch having a read and set terminal and a switch arm movable to either switch terminal, (i) said read terminal connecting said sensor directly to the negative input of said first operational amplifier, and said set terminal disconnecting said sensor; and (j) a network connecting said set terminal to said reference and input terminals of said analog amplifier to provide an output signal representative of a set voltage adjusted on said voltage divider network regardless of the output voltage of said sensor, while said read terminal connected in the circuit will provide a digital output voltage representative of the actual temperature of said object.

* * * * *